(12) United States Patent
Yang

(10) Patent No.: US 9,217,510 B2
(45) Date of Patent: Dec. 22, 2015

(54) WATER OUTLET

(71) Applicant: Ou Pi Sheng Co., Ltd., Taichung (TW)

(72) Inventor: Chin Chung Yang, Taichung (TW)

(73) Assignee: Ou Pi Sheng Co., Ltd., Taichung (TW)

( * ) Notice: Subject to any disclaimer, the term of this patent is extended or adjusted under 35 U.S.C. 154(b) by 88 days.

(21) Appl. No.: 14/107,468

(22) Filed: Dec. 16, 2013

(65) Prior Publication Data

US 2015/0167849 A1    Jun. 18, 2015

(51) Int. Cl.
*F16K 1/46* (2006.01)
*F16K 1/48* (2006.01)
*E03C 1/04* (2006.01)

(52) U.S. Cl.
CPC ............... *F16K 1/485* (2013.01); *E03C 1/0404* (2013.01)

(58) Field of Classification Search
CPC ........... F16K 1/46; F16K 31/60; F16K 1/485; E03C 1/0404
USPC ................. 137/801; 251/321–323; 4/678
See application file for complete search history.

(56) References Cited

U.S. PATENT DOCUMENTS

| | | | | |
|---|---|---|---|---|
| 162,773 | A * | 5/1875 | Shaw | 251/357 |
| 1,758,471 | A * | 5/1930 | Schmidt | 251/223 |
| 1,806,462 | A * | 5/1931 | Hopkins | 251/323 |
| 2,614,582 | A * | 10/1952 | St Clair | 137/512 |
| 2,920,861 | A * | 1/1960 | Hartmann | 251/368 |
| 3,730,224 | A * | 5/1973 | Prisk | 137/625.33 |
| 3,906,983 | A * | 9/1975 | Parkison | 137/467 |
| 6,668,393 | B1 * | 12/2003 | Mascari et al. | 4/678 |
| 6,925,662 | B1 * | 8/2005 | Tan et al. | 4/678 |
| 7,258,322 | B1 * | 8/2007 | Yang | 251/323 |
| 7,313,834 | B2 * | 1/2008 | Tan et al. | 4/678 |
| 7,578,309 | B2 * | 8/2009 | Breda | 137/119.05 |
| 7,857,286 | B1 * | 12/2010 | Huang | 137/801 |
| 2006/0042006 | A1 * | 3/2006 | Thomas | 4/678 |

* cited by examiner

*Primary Examiner* — John Bastianelli
(74) *Attorney, Agent, or Firm* — Wang Law Firm, Inc.; Li K. Wang; Stephen Hsu

(57) ABSTRACT

A water outlet has a sleeve to form a flowing channel and a control bar extends in the axial direction of the sleeve. The control bar has a water-blocking element that has a through hole and is mounted on the control bar. Both sides of the water-blocking element on the control bar are formed with a blocking part. The diameter of the through hole is larger than the diameter of the control bar. The distance between the two blocking parts is slightly larger than the thickness of the water-blocking element, so that the water-blocking elements can slightly swing with respect to the control bar to block the flowing channel.

5 Claims, 7 Drawing Sheets

WATER OUTLET

BACKGROUND OF THE INVENTION

1. Field of Invention

The invention relates to the structure of water outlet and, in particular, to a water outlet structure whose water-blocking elements can swing on the control bar thereof.

2. Related Art

The structure of a conventional water outlet is shown in FIG. 7. The flowing channel 5 has a control bar 6 that can shift along the axial direction. The control bar 6 has a water blocking element 61 extending in the radial direction. The water blocking element 61 is made of an elastic material such as rubber. When the user pulls the control bar 6 along the axial direction, the water blocking element 61 engages a shrinking section 51 of the flowing channel 5. The water blocking element 61 thus deforms to seal the flowing channel 5, preventing leakage.

After some time of use, the rubber of the water blocking element 61 hardens and loses its elasticity, thereby losing its water sealing effect. The water blocking element 61 may even cracks to render a leaking water outlet. In this case, it becomes inconvenient to replace it from time to time. On the other hand, even suppose the water blocking element 61 has good elasticity. Since the water blocking element 61 is fixed on the control bar 6, it cannot seal the shrinking section 51 of the flowing channel 5 if the control bar 6 deviates from the central axis for some reason. This still results in water leakage.

In view of the foregoing, it is an objective to solve the above-mentioned problems.

SUMMARY OF THE INVENTION

An objective of the invention is to provide an improved structure of water outlet whose water blocking element is mounted on the control bar in a swingable way. When the control bar deviates from its central axis, the water blocking element can still seal the outlet to prevent leakage.

To achieve the above-mentioned objective, the disclosed improved structure of water outlet has a housing inside which is provided with a sleeve. The sleeve is formed with a flowing channel for water to flow through and leading to an outlet of the housing. A control bar is provided inside the sleeve along the axial direction thereof. The control bar has a water blocking element. The control bar can be controlled to move along the axial direction, so that the water blocking element engages the sleeve and blocks the flowing channel. The water blocking element is a circular disk whose center has a through hole to be mounted on the control bar. Both sides of the water blocking element on the control bar are provided with a blocking part, respectively, thereby restricting the water blocking element between the two blocking parts. The diameter of the through hole is slightly larger than that of the control bar. The distance between the two blocking parts is slightly larger than the thickness of the water blocking element. Therefore, the water blocking element can slightly swing with respect to the water blocking element to block the flowing channel. One end of the through hole is formed with an engaging groove around the through hole. The engaging groove has anti-leakage element.

Preferably, the sleeve has a shrinking section. The water blocking element engages the shrinking section to block the flowing channel.

Preferably, the water blocking element is extended on one end of the through hole outward with a base. The engaging groove is formed on the base.

Furthermore, the anti-leakage element is an O-ring.

Preferably, the surrounding of the control bar is formed with an annular groove. The two blocking parts and the water blocking element are mounted in the annular groove. At least one of the blocking parts is an E-shaped buckle.

Preferably, the water blocking element is a hard circular plate.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
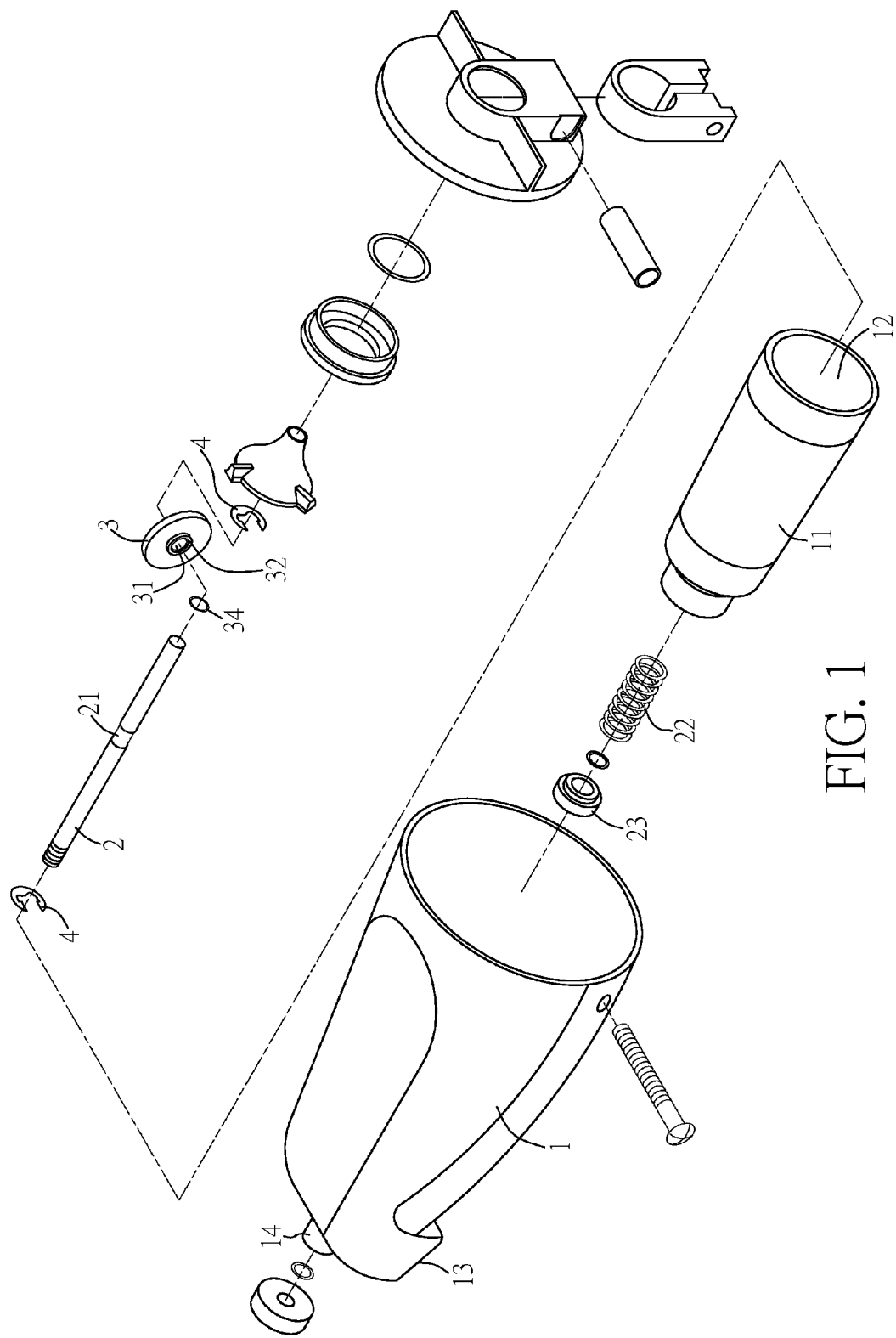
FIG. 1 is a three-dimensional exploded view of the invention.
Figure 2:
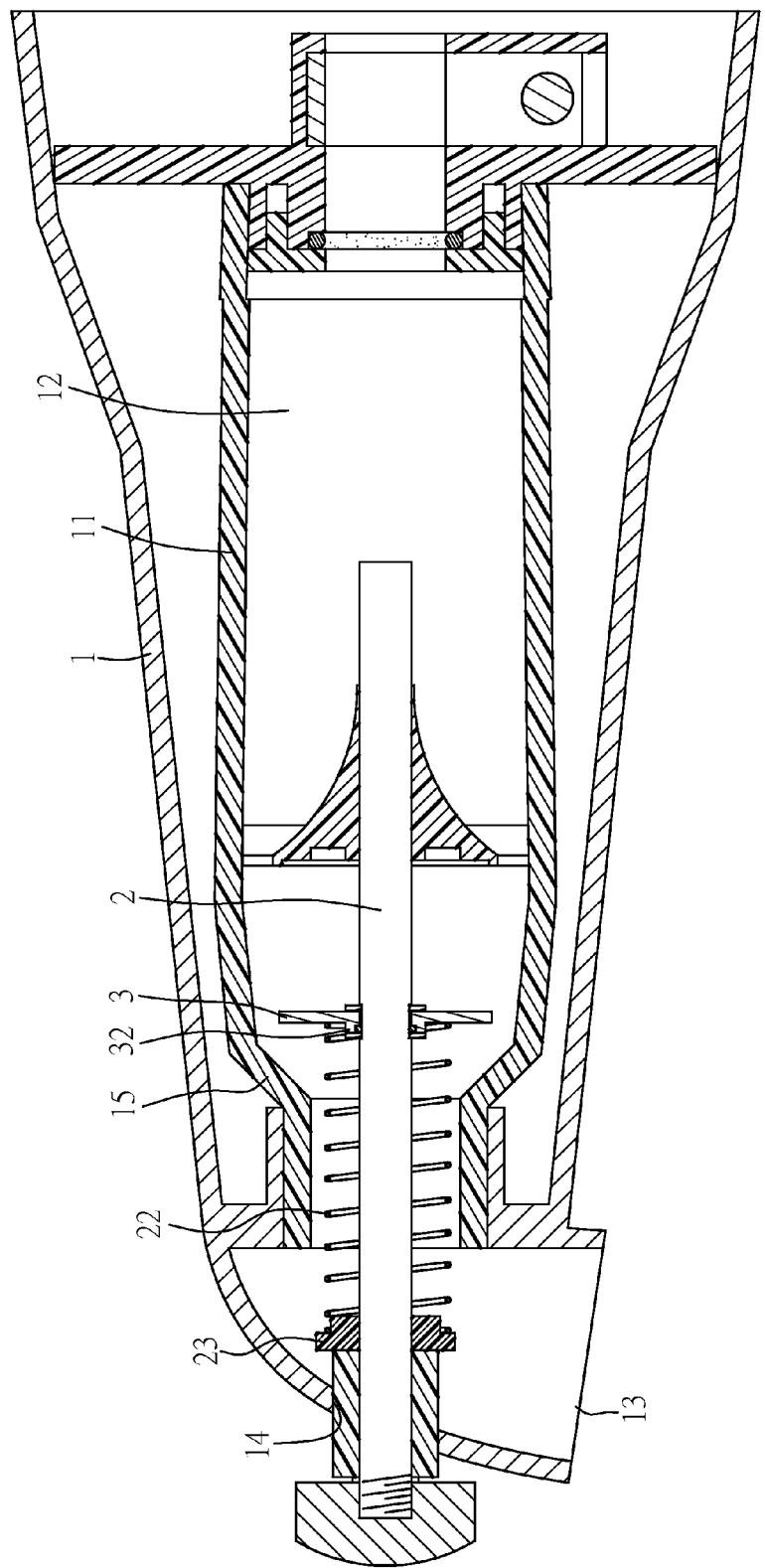
FIG. 2 is a cross-sectional view of the invention.

Please refer to FIGS. 1 and 2 for the improved structure of water outlet according to the invention. It has a housing 1 inside which is provided with a sleeve 11. The sleeve 11 is formed with a flowing channel 12 for water to go through and leading to an outlet 13 of the housing 1. The sleeve 11 has a control bar 2 inside along the axial direction thereof. The control bar 2 extends out via a through hole 14 of the housing 1 for the user to push and pull along the axial direction. The control bar 2 has a water blocking element 3 that engages a shrinking section 15 of the sleeve 11 as the control bar 2 moves axially, thereby blocking the flowing channel 12 and stopping water from flowing out.

Figure 3:
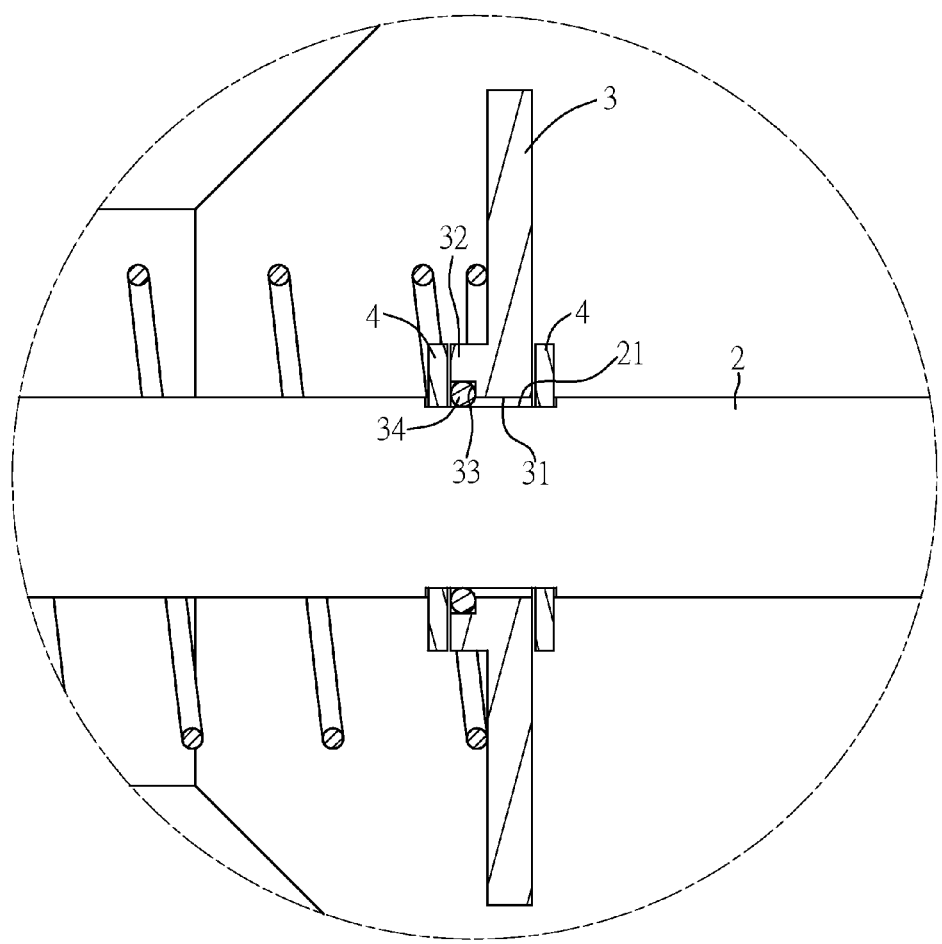
FIG. 3 is a locally enlarged cross-sectional view of the invention.
Figure 4:
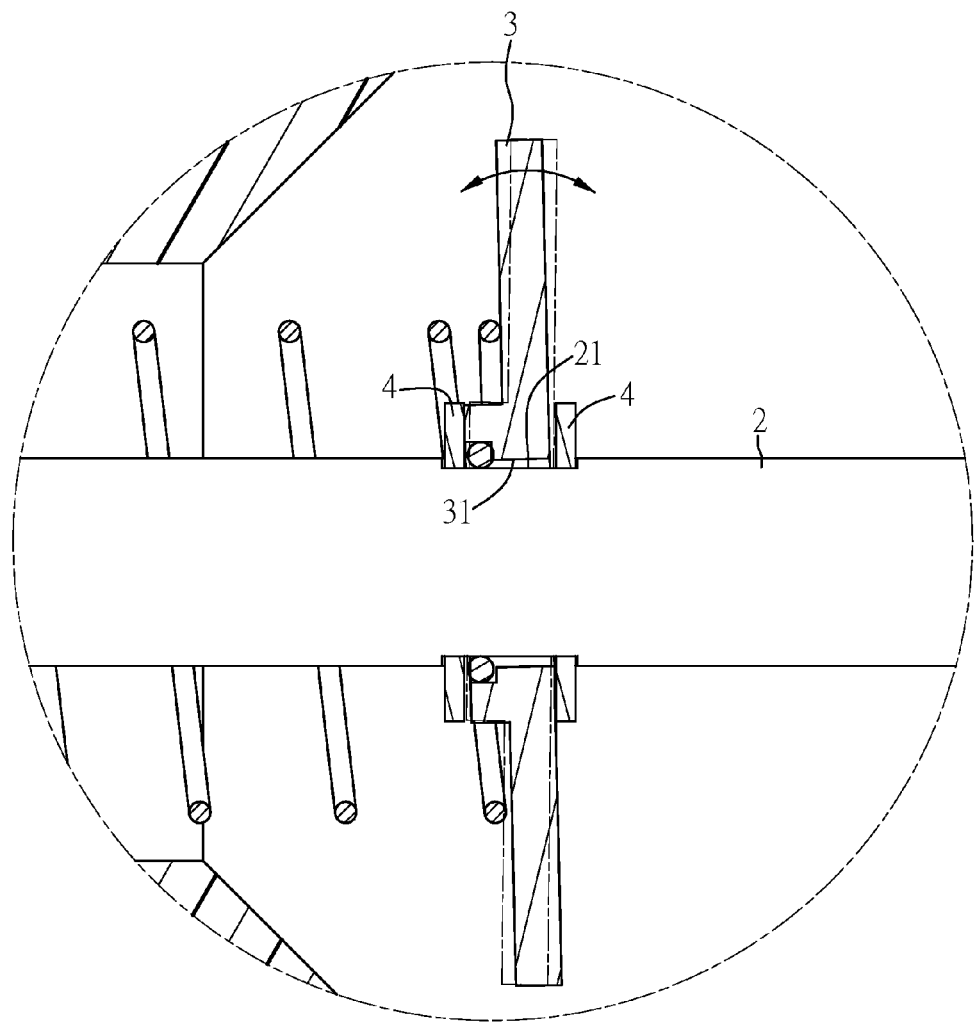
FIG. 4 is a schematic view showing the swing of the water blocking element.

As shown in FIG. 3, the water blocking element 3 is a hard circular plate whose center has a through hole 31. The diameter of the through hole 31 is slightly larger than that of the control bar 2. The water blocking element 3 is mounted on the control bar 2 via the through hole 31 thereof. In this embodiment, the surrounding of the control bar 2 is formed with an annular groove 21. The water blocking element 3 is mounted at the position of the annular groove 21 on the control bar 2. Both sides of the water blocking element 3 in the annular groove 21 are provided with a blocking part 4, respectively, to restrict the water blocking element 3 between the two blocking parts 4. At least one of the blocking parts 4 is an E-shaped buckle. In this embodiment, both of the blocking parts 4 are E-shaped buckles that are fixed and buckled to the annular groove 21. The distance between the two blocking parts 4 is slightly larger than the thickness of the water blocking element 3. Since there are a gap between the through hole 31 of the water blocking element 3 and the control bar 2 and gaps between the water blocking element 3 and the two blocking parts 4, the water blocking element 3 can slightly swing on the control bar 2, as illustrated in FIG. 4.

One end of the through hole 31 of the water blocking element 3 is extended outward with a base 32. The base 32 is formed with an engaging groove 33 around the through hole 31. The engaging groove 33 is provided with an O-ring 34 to seal the gap between the through hole 31 and the control bar 2, preventing water from leaking through. The surrounding of the control bar 2 is mounted with a spring 22, whose two ends urge against the water blocking element 3 and a fixed urging element 23. This is to assist the user to control the motion of the control bar 2.

Figure 5:
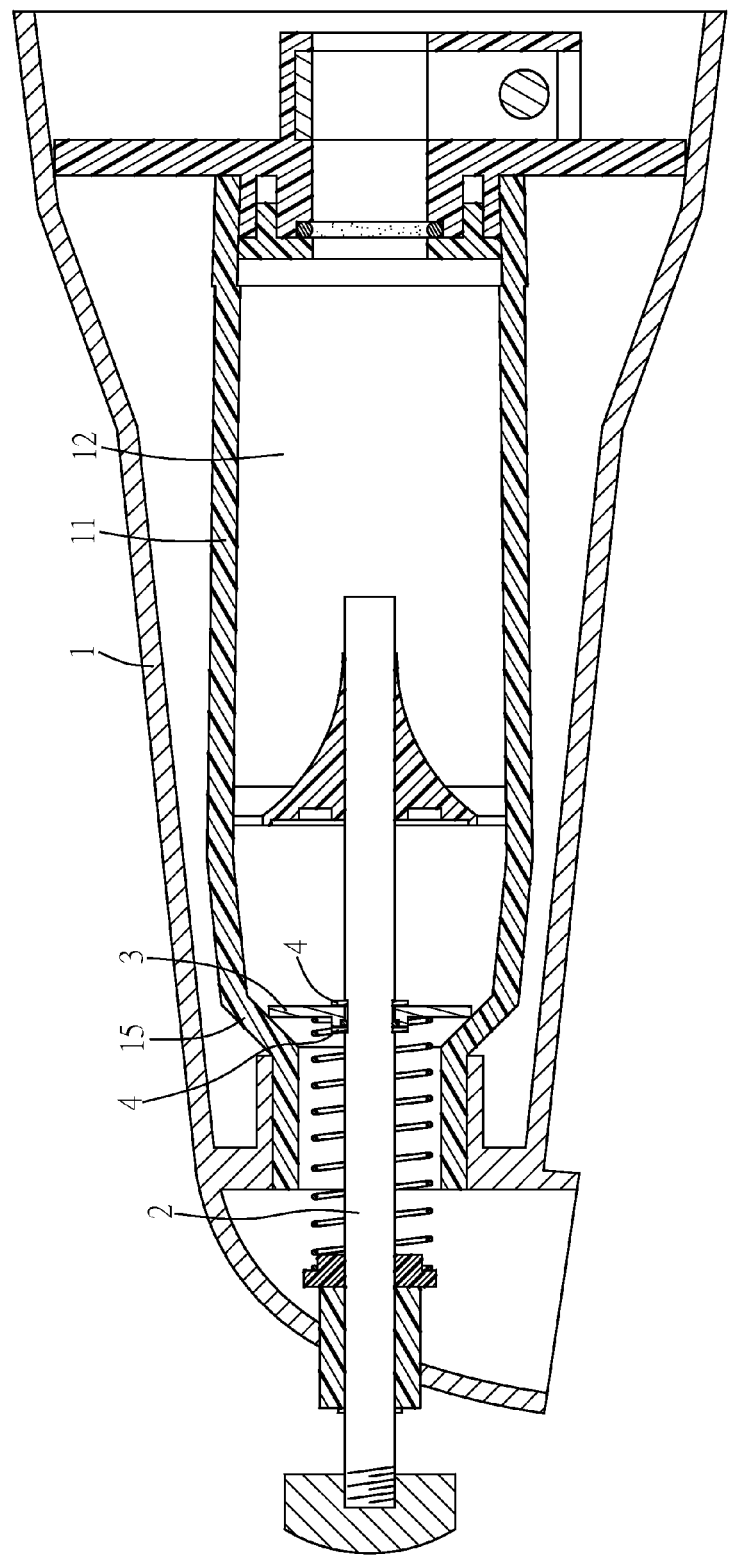
FIGS. 5 and 6 are schematic views of the invention in use.

When the control bar 2 is pushed into the housing 1, as shown in FIG. 2, the control bar 2 brings the water blocking element 3 to move to the right. The water blocking element 3 leaves the shrinking section 15 of the sleeve 11 so that the flowing channel 12 opens up. Water thus flows out of the outlet 13. When the control bar 2 is pulled out, as shown in FIG. 5, the water blocking element 3 urges against the shrinking section 15 of the sleeve 11. The sealing with the shrinking section 15 blocks the flowing channel to prevent water from flowing out.

Figure 6:
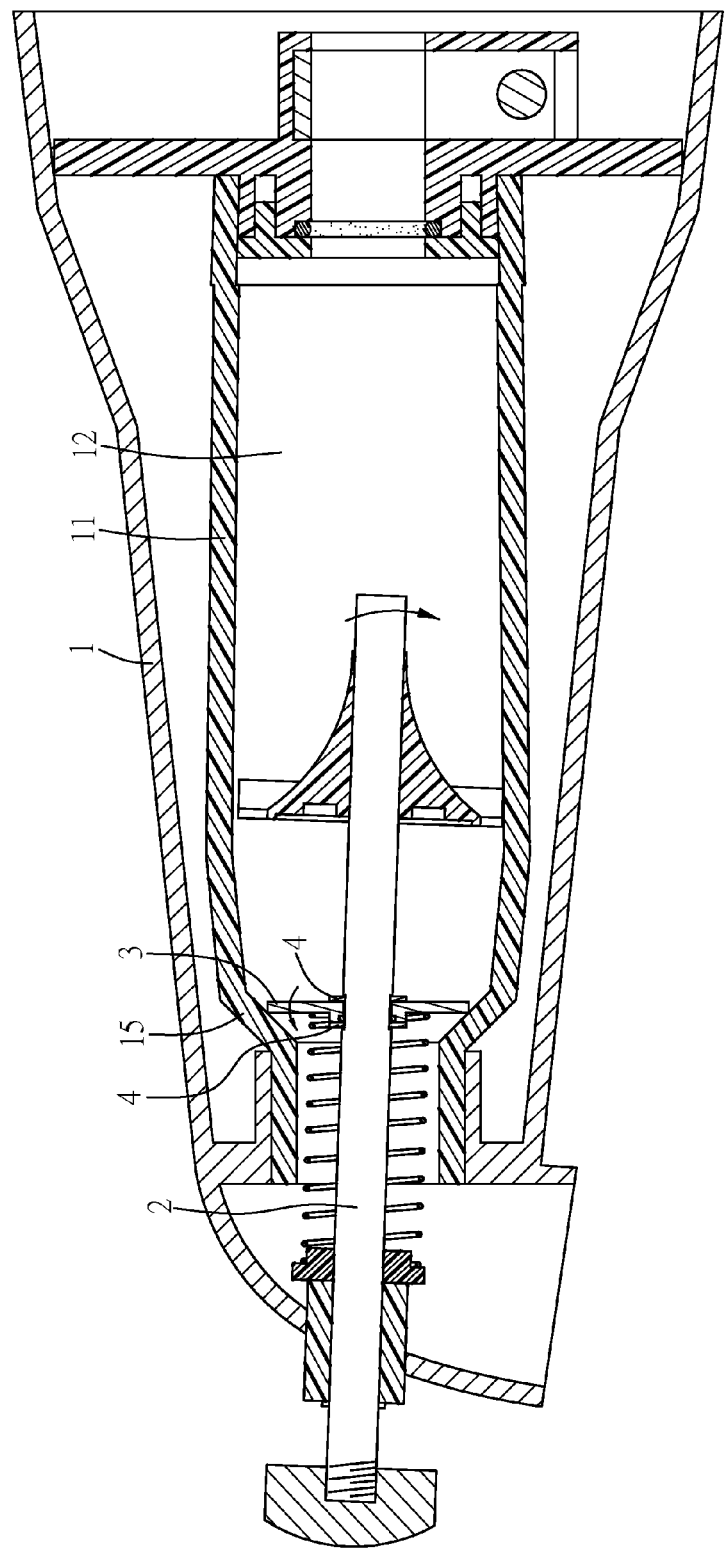
Figure 7:
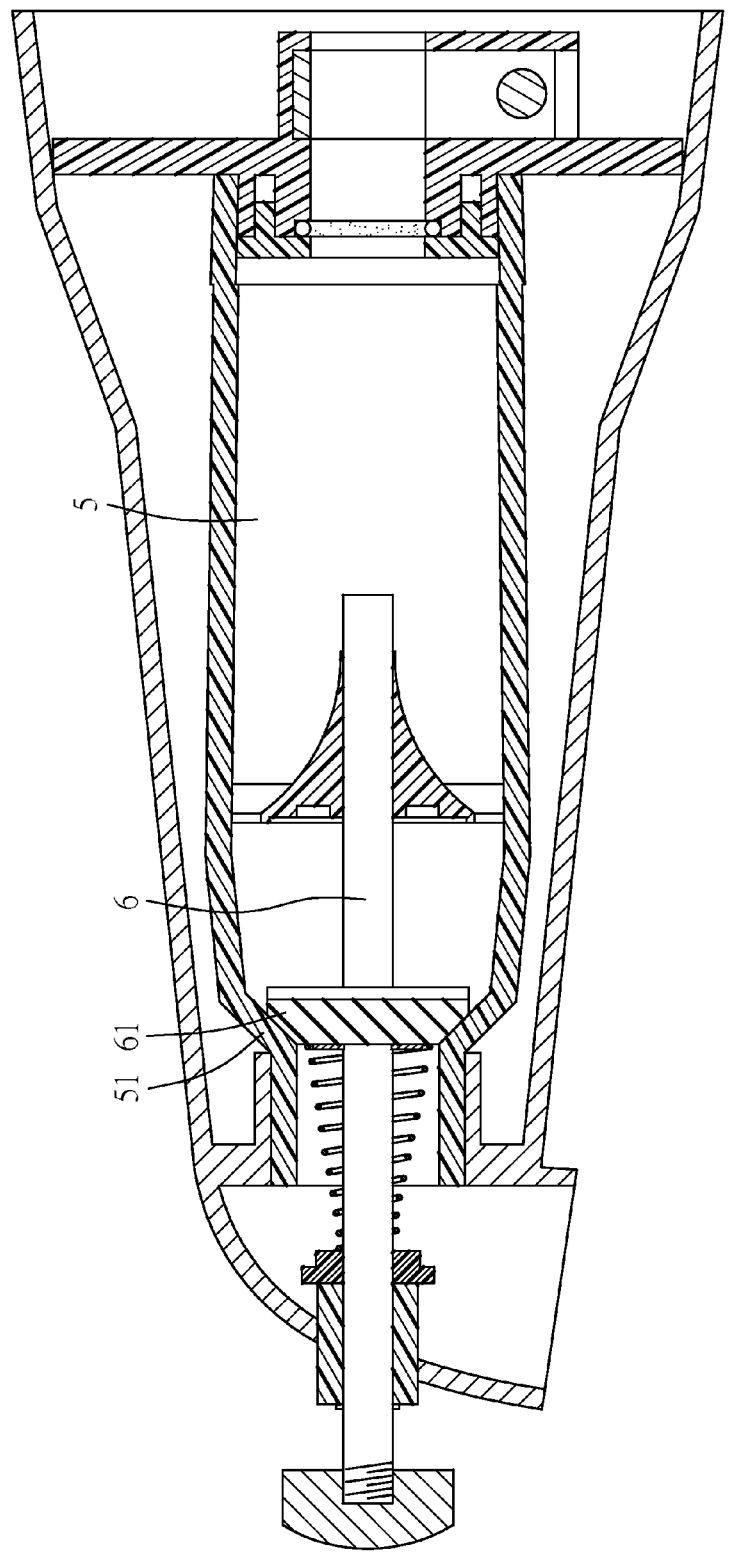
FIG. 7 is a cross-sectional view of a conventional water outlet.

When the control bar 2 deviates from its original central axis due to some abnormal reason, e.g., component erosion, the water blocking element 3 can swing slightly with respect to the control bar 2, as shown in FIG. 6. As the control bar 2 is in the skew state, the water blocking element 3 can swing by an opposite angle and still engages the shrinking section 15 of the sleeve 11, thereby blocking the flowing channel 12 and preventing leakage. Besides, the swing of the water blocking element 3 is pushed by water. The dynamics automatically swings the water blocking element 3 to an angle to seal the shrinking section 15. This does not require the control of the user, and is very convenient in preventing leakage.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A water outlet, comprising:
a housing with a sleeve formed with a flowing channel for water to flow through and leading to an outlet of the housing; and
a control bar extending axially inside the sleeve, the control bar being formed with an annular groove, the control bar having a water blocking element for engaging the sleeve and blocking the flowing channel when the control bar moves axially inside the sleeve,
wherein
the water blocking element is a circular plate with a through hole for mounting on the control bar, the water blocking element has two sides and a thickness, each side of the water blocking element on the control bar is provided with a blocking part to restrict the water blocking element between two blocking parts, the water blocking element and two blocking parts are mounted in the annular groove,
the through hole has a diameter that is slightly larger than a diameter of the control bar, and a distance between the two blocking parts is slightly larger than the thickness of the water blocking element,
at least one of the blocking parts is an E-shaped buckle, and
one end of the through hole is formed with an engaging groove around the through hole in which is provided with an anti-leakage element to prevent water from leaking through the engaging groove.

2. The water outlet as in claim 1, wherein the sleeve has a shrinking section and the water blocking element engages the shrinking section to block the flowing channel.

3. The water outlet as in claim 1, wherein one end of the through hole of the water blocking element is extended outward with a base on which the engaging groove is formed.

4. The water outlet as in claim 3, wherein the anti-leakage element is an O-ring.

5. The water outlet as in claim 1, wherein the water blocking element is a hard circular plate.

* * * * *